(12) United States Patent
Whang et al.

(10) Patent No.: US 6,496,817 B1
(45) Date of Patent: Dec. 17, 2002

(54) SUBSEQUENCE MATCHING METHOD USING DUALITY IN CONSTRUCTING WINDOWS IN TIME-SERIES DATABASES

(75) Inventors: Kyu-Young Whang, Taejon-si (KR); Yang-Sae Moon, Taejon-si (KR)

(73) Assignee: Korea Advanced Institute of Science & Technology, Taejon-si (KR)

( * ) Notice: Subject to any disclaimer, the term of this patent is extended or adjusted under 35 U.S.C. 154(b) by 0 days.

(21) Appl. No.: 09/559,673

(22) Filed: Apr. 27, 2000

(30) Foreign Application Priority Data

Dec. 20, 1999 (KR) .............................. 99-59467

(51) Int. Cl.⁷ .............................................. G06F 17/30
(52) U.S. Cl. ........................... 707/2; 707/6; 707/100; 707/102
(58) Field of Search .................. 707/1–3, 5, 6, 707/10, 100, 102; 435/6, 435, 432; 341/67; 370/347, 349; 714/435; 345/418, 716, 776, 838, 839

(56) References Cited

U.S. PATENT DOCUMENTS

| | | | | |
|---|---|---|---|---|
| 4,882,756 A | * | 11/1989 | Watari | 704/241 |
| 4,977,603 A | * | 12/1990 | Irie et al. | 358/462 |
| 5,544,352 A | * | 8/1996 | Egger | 707/5 |
| 5,570,370 A | * | 10/1996 | Lin | 370/347 |
| 5,647,058 A | | 7/1997 | Agrawal et al. | 707/1 |
| 5,664,174 A | * | 9/1997 | Agrawal et al. | 707/3 |
| 5,742,811 A | * | 4/1998 | Agrawal et al. | 707/5 |
| 5,799,301 A | * | 8/1998 | Castelli et al. | 707/3 |
| 5,819,266 A | * | 10/1998 | Agrawal et al. | 707/6 |
| 5,832,496 A | * | 11/1998 | Anand et al. | 345/835 |
| 5,930,789 A | * | 7/1999 | Agrawal et al. | 707/1 |
| 5,940,825 A | * | 8/1999 | Castelli et al. | 707/2 |
| 5,987,468 A | * | 11/1999 | Singh et al. | 707/100 |
| 6,012,062 A | * | 1/2000 | Jagadish et al. | 707/100 |
| 6,122,759 A | * | 9/2000 | Ayanoglu et al. | 714/4 |
| 6,301,575 B1 | * | 10/2001 | Chadha et al. | 707/2 |
| 6,360,188 B1 | * | 3/2002 | Freidman et al. | 703/1 |

OTHER PUBLICATIONS

"Efficient Similarity Search in Sequence Databases", By Agrawal, R., Faloutsos, C., and Swami, A., In. Proc. the 4th Int'l Conf. on Foundations of Data Organization and Algorithms, Chicago, Illinois, pp. 69–84, Oct. 1993.

"Fast Subsequence Matching in Time–Series Databases", By Faloutsos, C., Ranganathan, M., and Manolopoulos, Y., In. Proc. the ACM SIGMOD Int'l Conf. on Management of Data, Minneapolis, Minnesota, pp. 419–429, May 1994.

* cited by examiner

Primary Examiner—Hosain T. Alam
Assistant Examiner—Shahid Alam
(74) Attorney, Agent, or Firm—Bachman & LaPointe, P.C.

(57) ABSTRACT

A subsequence matching method in time-series databases, reduces the number of points stored in the multidimensional index and can store individual points directly in the index by dividing the data sequence into disjoint windows using duality in constructing windows. The method reduces false alarms and improves performance by searching the index using the individual points that represent sliding windows of the query sequence and by comparing the points used in the query and the points stored in the index. Moreover, the method can create the index much faster than the previous method by reducing the number of calls to the feature extraction function that is a major part of CPU overhead in the index creation.

6 Claims, 5 Drawing Sheets

Drawings
[Figure 1a]
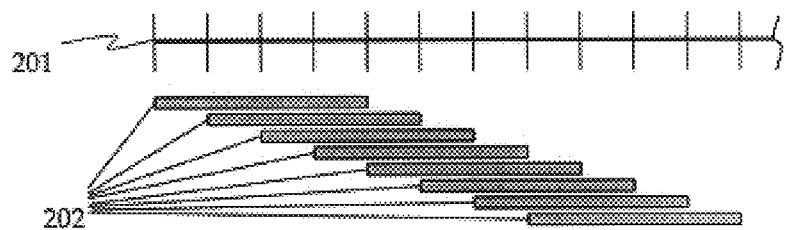
[Figure 1b]
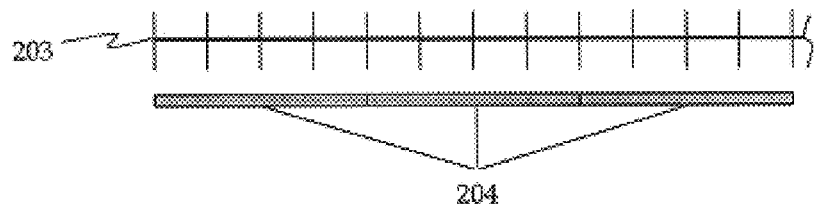
[Figure 2]
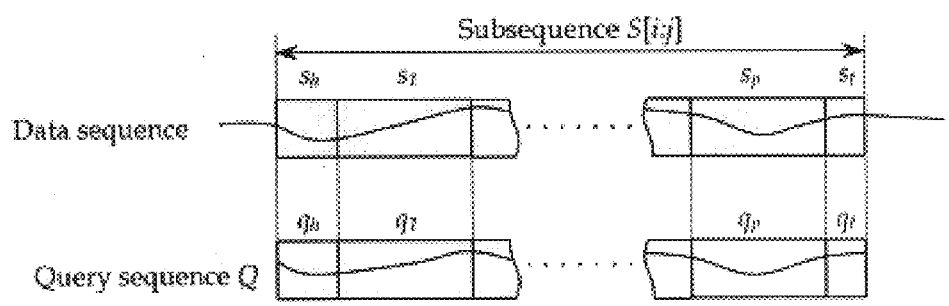

[Figure 3]
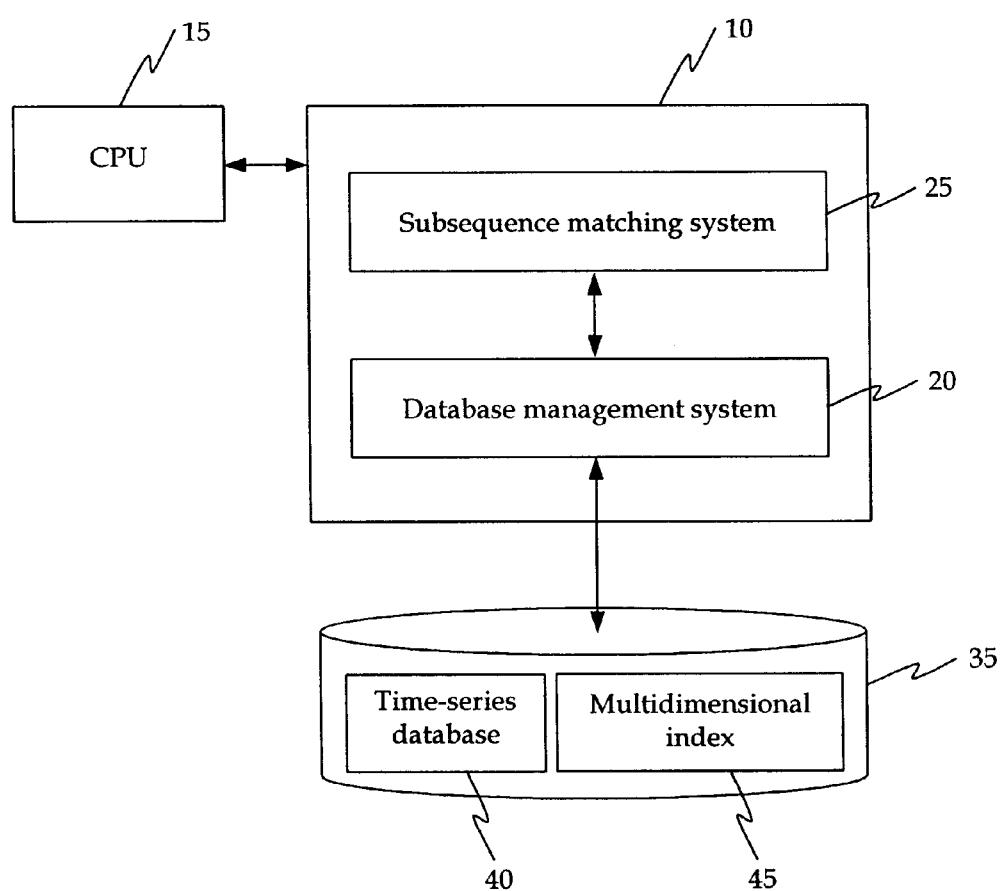

[Figure 4]
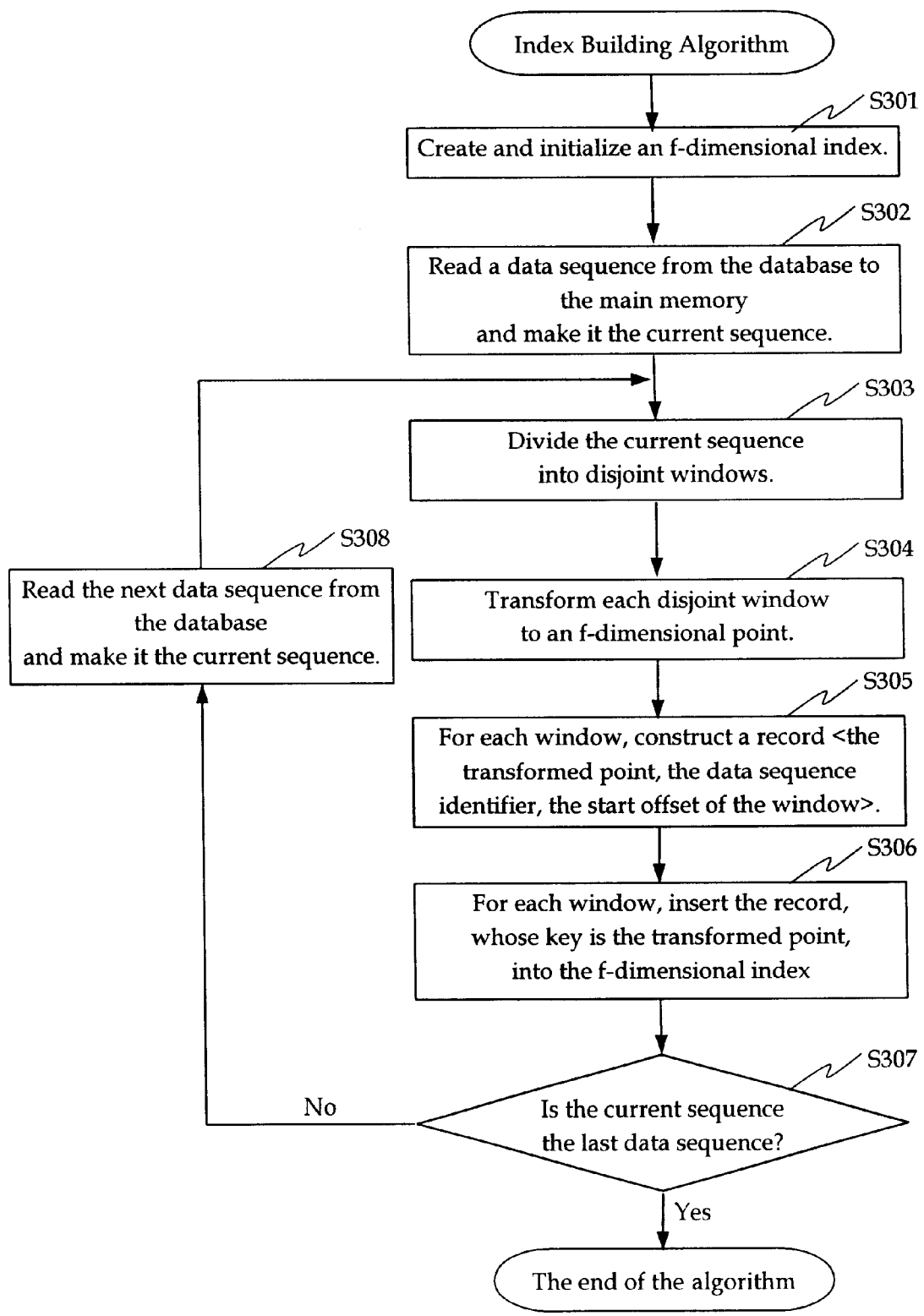

[Figure 5]
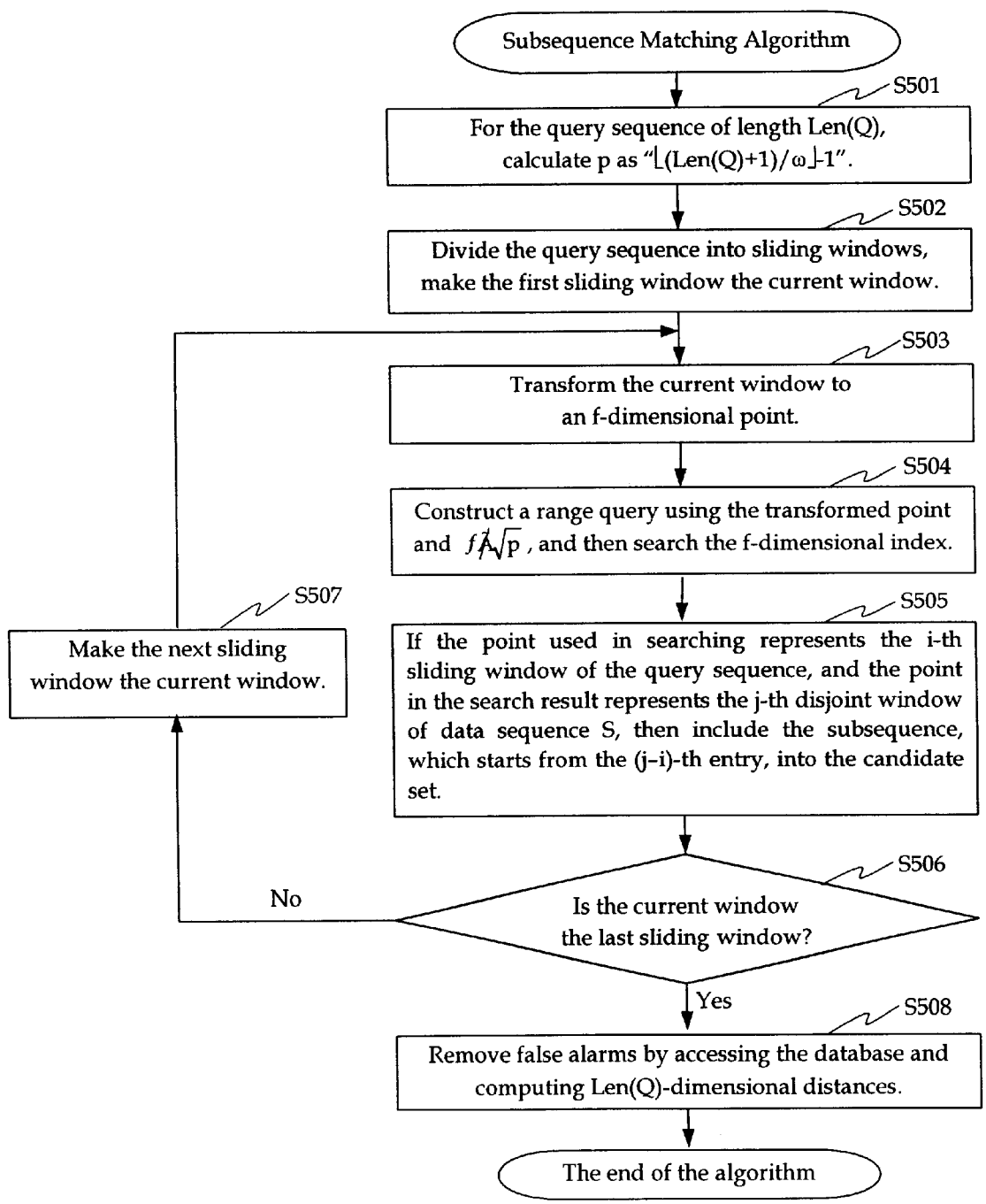

[Figure 6]
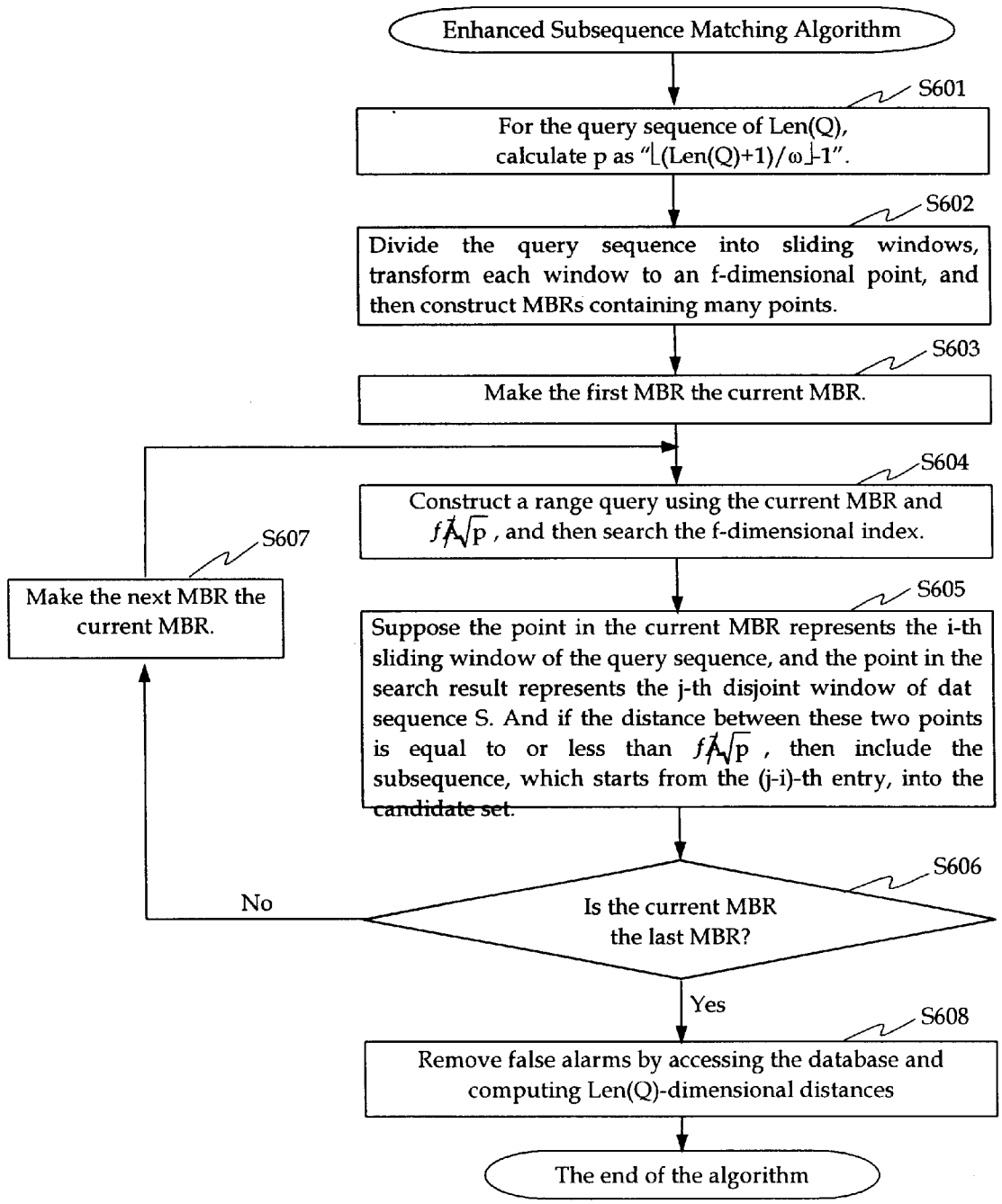

SUBSEQUENCE MATCHING METHOD USING DUALITY IN CONSTRUCTING WINDOWS IN TIME-SERIES DATABASES

FIELD OF THE INVENTION

The present invention relates to subsequence matching method in time-series databases, and particularly to such a method which improves performance by using duality in constructing windows, in time-series databases.

BACKGROUND OF THE INVENTION

First, we define some terminology needed in further description of the present invention.

A "sequence" of length n is an array of n entries. "Time-series data" are sequences of real numbers, representing values at specific time points. A "time-series database" is the database that stores time-series data.

The time-series data stored in a time-series database are called "data sequences." The sequences given by a user are called "query sequences." Finding data sequences similar to the query sequence from the database is called "similar sequence matching."

In the above definition, two sequences are said to be "similar" if the distance between them is less than or equal to the user specified "tolerance" $\epsilon$. We define that two sequences X and Y are in "$\epsilon$-match" if the distance between X and Y is less than or equal to $\epsilon$. We define "n-dimensional distance computation" as the operation that computes the distance between two sequences of length n.

In the above distance computation, the present invention is independent of the specific distance computation method. For easy understanding the present invention, however, we describe it based on the Euclidean distance computation method. Given two sequences $X=\{x_0, x_1, \ldots, x_{n-1}\}$ and $Y=\{y_0, Y_1, \ldots, y_{n-1}\}$ of the same length n, the Euclidean distance between X and Y is defined as $$\sqrt{\sum_{i=0}^{n-1} (x_i - y_i)^2}.$$

If a sequence S includes a sequence A (i.e., A is a part of S), A is called a "subsequence" of S. Similar sequence matching can be classified into the following two categories:

Whole matching: Given N data sequences $S_1, S_2, \ldots S_N$, a query sequence Q, and the tolerance $\epsilon$, we find those data sequences that are in $\epsilon$-match with Q. Here, the data and query sequences must have the same length.

Subsequence matching: Given N data sequences $S_1, S_2, \ldots, S_N$ of varying lengths, a query sequence Q, and the tolerance $\epsilon$, we find all the sequences $S_i$, one or more subsequences of which are in $\epsilon$-match with Q, and the offsets in Si of those subsequences.

A "Window" is a unit of dividing sequences. According to the dividing method, windows are classified into a sliding window and a disjoint window. The windows starting from every possible offset in a sequence are called "sliding windows." FIG. 1a is an example drawing of a method that divides a sequence into sliding windows of size 4. In FIG. 1a, reference no. 201 is a sequence, and reference no. 202 are sliding windows of size 4. The windows starting from multiple offsets of window size are called "disjoint windows." FIG. 1b is an example drawing of a method that divides a sequence into disjoint windows of size 4. In FIG. 1b, reference no. 203 is a sequence, and reference no. 204 are disjoint windows of size 4.

In subsequence matching, "false dismissals" are the subsequences that are in $\epsilon$-match with the given query sequence but missed by errors, and "false alarms" are the subsequences that are not in $\epsilon$-match with the query sequence but selected as similar subsequences. False dismissals and false alarms should not occur in the above similar sequence matching.

The function used to extract f, which is less than n, features from a sequence of length n is called the "feature extraction function." To use a feature extraction function in similar sequence matching, the function should guarantee no false dismissals. To guarantee no false dismissals, the feature extraction function is satisfied some conditions that are presented in Agrawal, R., Faloutsos, C., and Swami, A., "Efficient Similarity Search in Sequence Databases," In Proc. the 4th Int'l Conf. on Foundations of Data Organization and Algorithms, Chicago, Ill., pp. 69–84, October 1993.[Reference 1] and Faloutsos, C., Ranganathan, M., and Manolopoulos, Y., "Fast Subseqeunce Matching in Time-Series Databases," In Proc. Int'l Conf. on Management of Data, ACM SIGMOD, Minneapolis, Minn., pp. 419–429, May 1994.[Reference 2]

We also define some notation to be needed in further description of the present invention.

Len(S) is the length of sequence S. S[k] is the k-th entry of the sequence S, S[i:j] is the subsequence that is including entries from the i-th one to j-th, and S[i:j] can be represented as S[i:k]S[k+1:j]. Next, when S is divided into disjoint windows, si represents the i-th disjoint window of sequence S. Lastly, $\omega$ is the length of the sliding or disjoint window.

Recently, the large amount of time-series data are occurred in various areas such as stock prices, growth rates of companies, exchange rates, biomedical measurements, and weather data. And, owing to faster computing speed and larger storage devices, there have been a number of efforts to utilize the large amount of time-series data. Especially, similar sequence matching in time-series data has become an importance research topic in data mining that is one of new database applications.

In the below description, we explain the previous similar sequence matching methods in time-series databases.

In the previous method of [Reference 1], authors have introduced a solution for the whole matching problem. The outline of the solution is as follows.

First, each data sequence of length n is transformed into an f-dimensional point by using the feature extraction function, and this point is indexed using the f-dimensional index. Only a small number of features are extracted because of the difficulty in storing high-dimensional sequences in the multidimensional index due to dimensionality problem in multidimensional indexes (called "dimensionality curse"). Next, a query sequence is similarly transformed to an f-dimensional point, and a range query constructed using the point and the given tolerance $\epsilon$. Then, the multidimensional index is searched to evaluate the query, a candidate set constructed consisting of the feature points that are in $\epsilon$-match with the query sequence. This method guarantees no false dismissal, but may cause false alarms because it uses only f features instead of n.

Thus, for each candidate sequence, the actual data sequence is accessed from the disk; the distance from the query sequence computed; and the candidate is discarded if it is a false alarm. This last step, which eliminates false alarms, is called the "post-processing step."

And, in the previous method of [Reference 2], authors have proposed the subsequence matching method as a generalization of the whole matching method of [Reference 1]. In the present invention, we simply call this method "FRM" by taking authors' initials. The outline of the method is as follows.

In subsequence matching, subsequences similar to the query sequence can be found anywhere in a data sequence. In FRM, to find all possible subsequences, they use a sliding window of size $\omega$ starting from every possible offset in the data sequence. Then, they divide a query sequence into disjoint windows of size $\omega$ and retrieve similar subsequences by using those disjoint windows. They transform each sliding window to a point in a lower dimensional space. Since too many points are generated to be stored individually in an index, they construct minimum bounding rectangles(MBRs) that contain hundreds or thousands of points, using a heuristic method, and then, store those MBRs into a multidimensional index. Lastly, they try to do the subsequence matching on query sequences of various lengths.

For subsequence matching on query sequences of various lengths, FRM presents and uses the following two theorems.

Theorem 1

When two sequences S and Q of the same length are divided into p disjoint windows $s_i$ and $q_i$ ($1 \leq i \leq p$) respectively, if S and Q are in $\epsilon$-match, then at least one of the pairs ($s_i$, $q_i$) are in $\epsilon/\sqrt{p}$-match.

Theorem 2

If two sequences S and Q of the same length are in $\epsilon$-match, then any pair of subsequences (S[i:j],Q[i:j]) are also in $\epsilon$-match.

By using the above Theorem 1 and 2, FRM divides the query sequence into p disjoint windows, transforms each window to an f-dimensional point, makes a range query using the point and the tolerance $\epsilon/\sqrt{p}$, and constructs a candidate set by searching the multidimensional index. Lastly, it performs the post-processing step to eliminate false alarms by accessing the data sequence and executing Len (Q)-dimensional distance computation for each candidate.

In the subsequence matching, the more false alarms are included in the candidate set constructed by searching the index, the more disk accesses and CPU operations for Len(Q)-dimensional distance computations are incurred in the post-processing step. Thus, false alarms are the main cause of performance degradation.

In the FRM, the main reason why false alarms occur is that it does not store individual points directly in the multidimensional index, but store only MBRs that contain multiple points. That is, for the same range query, there are many subsequences that do not become candidates in case of storing individual points but become candidates in case of storing only MBRs.

In the FRM, however, if every individual point are stored in the index, it generates too many f-dimensional points (almost the sum of lengths of all data sequences). And thus, it needs f times more storage than is required by original data sequences. Moreover, the search performance may significantly degrade due to the excessive height of the multidimensional index (refer to [Reference 2]). Accordingly, FRM cannot obtain the "point-filtering effect," which reduces false alarms by storing individual points directly in the index and by using them for the point-to-point comparison, because of storing only MBRs. Thus, it has the problem of increasing many false alarms and degrading performance significantly.

SUMMARY OF THE INVENTION

The present invention is devised to solve the problems of the previous method discussed above. A purpose of the present invention is to provide a subsequence matching method in time-series databases, called "Dual Match" (Duality-based subsequence Matching), which reduces false alarms drastically and improves performance significantly by using duality in constructing windows, that is, by dividing data sequences into disjoint windows and the query sequence into sliding windows.

Another purpose of the present invention is to provide a subsequence matching method in time-series databases that reduces false alarms drastically and improve performance significantly by storing individual points directly in the index, in turn, by exploiting the point-filtering effect.

Another purpose of the present invention is to provide a subsequence matching method in time-series databases that creates the index faster than the previous method by reducing the number of calls to the feature extraction function, which is a major part of CPU overhead in index creation.

As the first characteristic to accomplish the purposes, the present invention provides a subsequence matching method in time-series databases that consists of the following four steps: the first step that uses duality in constructing windows; the second step that divides data sequences into disjoint windows based on the first step; the third step that divides the query sequence into sliding windows based on the first step; and the fourth step that performs subsequence matching using the windows constructed in the second and third steps.

As the additional characteristic in the above fourth step, to exploit the point-filtering effect and reduce false alarms, the present invention includes the following two steps: storing individual points-which represent the disjoint windows of the data sequences-directly in the multidimensional index and using individual points-which represent the sliding windows of the query sequence-directly in the range queries.

At this time, to reduce the number of range queries, the present invention provides the step that uses MBRs containing multiple points rather than individual points—which represent sliding windows of the query sequence—for the range queries to construct a candidate set.

Moreover, as the additional characteristic in the fourth steps, the present invention includes the step that divides data sequences into disjoint windows rather than sliding windows for the fast index creation by reducing the number of calls to the feature extraction function that is needed in the index creation.

In the meanwhile, as the second characteristic to accomplish the purposes, the present invention provides a subsequence matching method in time-series databases that includes the following index building process to create a multidimensional index for subsequence matching.

The index building process consists of the following eight steps: the first step that creates and initializes an f-dimensional index; the second step that reads a data sequence from the database to the main memory; the third step that divides the data sequence, which is read in the second or eighth step, into disjoint windows; the fourth step that transforms the disjoint window to an f-dimensional point; the fifth step that constructs a record <the transformed point, the data sequence identifier, the start offset of the window>; the sixth step that inserts the record into the f-dimensional index; the seventh step that checks whether there is any more sequence to read from the database or not, after repeating from the third step to the fifth step for all disjoint windows; and the eighth step that ends the index building process if there is no more data sequence to read, or continues the process by returning to the third step after reading a data sequence if there is a data sequence to read.

Moreover, as the third characteristic to accomplish the purposes, the present invention provides a subsequence matching method in time-series databases that includes the following subsequence matching process to find similar subsequences to the user specified query sequence by using the multidimensional index and the time-series database.

The subsequence matching process consists of the following seven steps: the first step that calculates the minimum number of disjoint windows included in a subsequence; the second step that divides a query sequence into sliding windows; the third step that transforms the sliding window to an f-dimensional point by using the feature extraction function; the fourth step that constructs a range query using the transformed point, the number of disjoint windows obtained from the first step, and the user specified tolerance; the fifth step that evaluates the range query, which is made in the fourth step, and constructs a candidate set by using the search result; the sixth step that reads a candidate subsequence from the database to the main memory after completing the construction of the candidate set by repeating from the third step to the fifth step for all sliding windows; and the seventh step that checks whether the candidate subsequences are false alarms or not by calculating the distances between them and the query sequence.

Moreover, as the fourth characteristic to accomplish the purposes, the present invention provides a subsequence matching method in time-series databases that includes the following enhanced subsequence matching process to find similar subsequences to the user specified query sequence by using the multidimensional index and the time-series database with the reduction of the number of range queries.

The enhanced subsequence matching process consists of the following seven steps: the first step that calculates the minimum number of disjoint windows included in a subsequence; the second step that divides a query sequence into sliding windows, transforms each sliding window to an f-dimensional point, and then construct MBRs contains these transformed points; the third step that constructs a range query using an MBR made in the second step, the number of the disjoint windows obtained from the first step, and the user specified tolerance; the fourth step that evaluates the range query constructed in the third step; the fifth step that finds candidate set by calculating the distance between each point contained in the MBR, which is used for constructing the range query in the third step, and each point in the search result in the fourth step; the sixth step that reads a candidate subsequence from the database to the main memory after completing the construction of the candidate set by repeating from the third step to the fifth step for all MBRs; and the seventh step that checks whether the candidate subsequences are false alarms or not by calculating the distances between them and the query sequence.

As the above description, Dual Match of the present invention divides data sequences into disjoint windows and a query sequence into sliding windows, on the other hand, FRM, the previous method, divides data sequence into sliding windows and the query sequence into disjoint windows. Thus, Dual Match can reduce many false alarms and improve performance by using this dual approach of the previous method.

The FRM causes many false alarms by storing only MBRs containing multiple points rather than individual points representing windows to save the storage space for the index. However, Dual Match of the present invention solves this problem by directly storing individual points in the index with the same storage space used in FRM.

Moreover, the present invention exploits the point-filtering effect that reduces false alarms by storing individual points in the index and using the stored points for the point-to-point comparison.

BRIEF DESCRIPTION OF THE DRAWINGS

FIG. 1a is an example drawing of a method that divides a sequence into sliding windows; and FIG. 1b is an example drawing of a method that divides a sequence into disjoint windows.

FIG. 2 is an example drawing of a method that represents a subsequence and a query sequence as windows.

FIG. 3 is a system block diagram according to embodiment of the present invention.

FIG. 4 is a flowchart showing an index building algorithm that creates a multidimensional index in a subsequence matching method of the present invention.

FIG. 5 is a flowchart showing a subsequence matching algorithm that finds similar subsequences in a subsequence matching method of the present invention.

FIG. 6 is a flowchart showing an enhanced subsequence matching algorithm finding a similar subsequence that reduces the number of range queries in a subsequence matching method of the present invention.

DESCRIPTION OF THE PREFERRED EMBODIMENT

In the below description, we explain the theoretical bases in more detail to prove that Dual Match can find all similar subsequences without any false dismissal.

We first define some terminology to explain Dual Match of the present invention.

When S is divided into fixed disjoint windows, we define the "included windows" for S[i:j] as those disjoint windows included in S[i:j]. We define the "minimum number of included windows" for a subsequence of length L as the minimum one over all subsequences of the same length regardless of their positions in S. We denote the minimum number of included windows by p. If the minimum number of included windows for a subsequence of length L is p, then the number of included windows for every subsequence of the length L is equal to or greater than p regardless of its position. We can obtain the minimum number of included windows using the following Theorem 3.

Theorem 3

If the sequence S is divided into disjoint windows of size $\omega$, the minimum number of included windows p for subsequences of length L is "$[(L+1)/\omega]-1$."

According to the Theorem 3, a subsequence of length Len(Q) includes at least "$[(Len(Q)+1)/\omega]-1(=p)$" disjoint windows. Here, Q means a query sequence. And, Dual Match can construct a candidate set of similar subsequences without any false dismissal based on the following Theorem 4.

Theorem 4

Suppose a data sequence S is divided into disjoint windows of size $\omega$, and a query sequence Q into sliding windows of the same size $\omega$. If the subsequence S[i:j] of length Len(Q) is in $\epsilon$-match with Q, then at least one disjoint window S[i+k:i+k+$\omega$−1] ($0 \leq k \leq Len(Q)-\omega$) is in $\epsilon/\sqrt{p}$-match with the sliding window Q[k:k+$\omega$−1]. Here, p is the minimum number of included windows for subsequences of length Len(Q) obtained by the Theorem 3.

Using FIG. 2, we can prove the Theorem 4 as followings.

In FIG. 2, suppose a subsequence S[i:j] is in ε-match with a query sequence Q. At this point, since the minimum number of include windows is p, S[i:j] must include at least p disjoint windows. In FIG. 2, S[i:j] includes p disjoint windows $s_1, \ldots, s_p$, and also (possibly null) subsequences $s_h$(at the head) and $s_t$(at the tail). Thus, S[i:j] can be represented as $s_h s_1 \ldots s_p s_t$.

Similarly, query sequence Q can be represented as $q_h q_l \ldots q_p q_t$. By this representation, if S[i:j] and Q are in ε-match, then $s_l \ldots s_p$ and $q_l \ldots q_p$ are also in ε-match by Theorem 2. And, if $s_l \ldots s_p$ and $q_l \ldots q_p$ are in ε-match, then at least one of the pairs $(s_k, q_k)$ are in $\epsilon/\sqrt{p}$-match by Theorem 1. Hence, if S[i:j] and Q are in ε-match, S[i:j] includes more than p(=the minimum number of included windows) disjoint windows and at least one of them must be in $\epsilon/\sqrt{p}$-match with a sliding window $q_k$ of Q.

At query time, since we use sliding windows and place them at every possible offset in the query sequence Q, the window $q_k$ in the Theorem 4 must be one of those sliding windows. According to the Theorem 4, if we construct the candidate set with those subsequences that have an included window in $\epsilon/\sqrt{p}$-match with a sliding window of Q, i.e., that satisfy the necessary condition of the Theorem 4, then we will not encounter any false dismissal.

We can obtain the maximum window size of Dual Match of the present invention using the following Theorem 5.

Theorem 5

If the minimum length of the query sequence is given by Min(Q), then the maximum window size allowed in Dual Match is "$[(Min(Q)+1)/\omega]$."

In the below description, we explain the preferred embodiment of the present invention in more detail by using the attached drawings.

Dual Match of the present invention consists of two processes, an index building process and a subsequence matching process. To accomplish the technical purposes of the invention, we need the database management system facility that is able to store and maintain time-series data and to support the multidimensional index structure.

To perform subsequence matching efficiently, the present invention needs the hardware environment that is drawn in FIG. 3. In FIG. 3, reference no. 10 represents a main memory of a computer and reference no. 15 represents a CPU of a computer. At this point, the subsequence matching system(25) and the database management system(20) are worked in the above main memory(10). And, Dual Match of the present invention is implemented as the subsequence matching system(25). The database management system(20) maintains the time-series database(40) and the multidimensional index(45) that are stored in the database storage device(35). The subsequence matching system(25) uses and accesses the time-series database(40) and the multidimensional index(45) by using the database management system (20).

The input to the index building process is a database containing data sequences; the output a multidimensional index, which will be used in the subsequence matching. FIG. 4 is a flowchart showing an algorithm for the index building process.

The algorithm consists of eight steps. In the first step (S301), Dual Match creates and initializes an f-dimensional index. In the second step(S302), it reads a data sequence from the database to the main memory. In the third step (S303), it divides the data sequence, which is read in the second or eighth step(S302 or S308), into disjoint windows. Next, in the fourth step(S304), it transforms each disjoint window to an f-dimensional point.

In the fifth step(S305), it constructs a record using the point representing a disjoint window, the data sequence identifier that includes the window, and the start offset of the window. In the sixth step(S306), it inserts the record, which is constructed in the fixth step(S305), into the f-dimensional index. By repeating from the third step(S303) to the sixth step(S306), it inserts the points into the index for all disjoint windows.

In the seventh step(S307), it checks whether there is any more data sequence to read from the database or not. If there are more data sequences, then it reads a data sequence in the eighth step(S308) and continues the index creation by returning to the third step(S303). Otherwise, it ends the index building algorithm.

On the other hand, the subsequence matching process takes the time-series database, the index, the query sequence Q, and tolerance ε as the inputs and finds similar subsequences to the query sequence Q as the outputs. FIG. 5 is a flowchart showing an algorithm for the subsequence matching process.

The algorithm consists of seven steps. In the first step (S501), Dual Match calculates the minimum number of included windows for the query sequence of length Len(Q) as "$p=[(Len(Q)+1)/\omega]$" (1" based on Theorem 3. In the second step(S502), it divides the query sequence into sliding windows. Next, it repeats from the third step(S503) to the fifth step(S505) for each sliding window. In the third step (S503), it transforms the sliding window to an f-dimensional point by using the feature extraction function. In the fourth step(S504), it construct a range query using the transformed point and $\epsilon/\sqrt{p}$.

In the fifth step(S505), it evaluates the range query, using the index, retrieving the points that are in $\epsilon/\sqrt{p}$-match with the point for the sliding window. If the point used in searching corresponds to the i-th sliding window, and the point in the search result corresponds to the j-th disjoint window of data sequence S, then it includes the subsequence, which starts from the (j-i)-th entry, into the candidate set. By repeating from the third step(S503) to the fifth step(S505) for each sliding window, it constructs the candidate set.

After completing the construction of the candidate set by the above steps, it repeats from the sixth step(S506) and the seventh step(S507) for each candidate subsequence in the canidate set. In the sixth step(S506), it reads a candidate subsequence from the database to the main memory. In the seventh step(S507), it calculates the Len(Q)-dimensional distance between the candidate subsequence and the query sequence. If the distance is greater than ε, the subsequence is discarded because it is a false alarm. Otherwise, the subsequence is selected as the similar subsequence.

By using the above index building algorithm and subsequence matching algorithm, we can reduce the false alarms caused by lack of the point-filtering effect. This is done by storing individual points-which represent the disjoint windows of data sequences-into the index directly and by using the individual points-which represent the sliding windows of the query sequence-to search the index. That is, we can reduce many false alarms by using individual points directly for storing and searching, in turn, by exploiting the point-filtering effect. By reducing those false alarms, we can reduce the number of candidates drastically and improve performance significantly because of reducing disk accesses and Len(Q)-dimensional distance computations.

To correct the performance degradation problem caused by evaluating many range queries-one for each each sliding windows, the present invention also presents the following enhanced subsequence matching process to reduce the number of range queries.

The enhanced subsequence matching process also finds similar subsequences to the given query sequence. The inputs and the outputs of the enhanced algorithm are the same as those of the previous above subsequence matching process. FIG. 6 is a flowchart showing an algorithm for the enhanced subsequence matching process.

The algorithm consists of seven steps. In the first step (S601), Dual Match calculates the minimum number of included windows for the query sequence of length Len(Q) as "p=[(Len(Q)+1)/ω] (1" based on the Theorem 3. In the second step(S602), it divides the query sequence into sliding windows, transforms each window to an f-dimensional point, and then constructs MBRs contains these multiple points.

As the above method for constructing windows, we may use various techniques for constructing MBRs. Examples are 1) the heuristics used in FRM, 2) using a fixed number of points in an MBR, and 3) using only one MBR containing all the points. In general, if the query sequence is short, using only one MBR is effective since the number of range queries are small (Len(Q)≦4 ω)). However, if the query sequence is long (Len(Q)≧5 ω), using several MBRs is more effective since MBRs do not become too large.

Next, it repeats from the fourth step(S604) to the fifth step(S605) for each MBR. In the third step(S603), it constructs a range query using the MBR and $\epsilon/\sqrt{p}$. In the fourth step(S604), it evaluates the range query, using the index, retrieving the points that are in $\epsilon/\sqrt{p}$-match with the MBR. In the fifth step(S605), it finds candidates by calculating the distance between each point in the MBR and each point in the search result.

In more detail, when the point in the MBR represents the i-th sliding window of the query sequence, and the point in the search result represents the j-th disjoint window of data sequence S, if the f-dimensional distance between these two points is equal to or less than $\epsilon/\sqrt{p}$, then Dual Match includes the subsequence, which starts from the (j−i)-th entry, into the candidate set. By repeating from the third step(S603) to the fifth step(S605) for each MBR, it constructs the candidate set. Next, it repeats from the sixth step(S606) and the seventh step(S607) for each candidate subsequence in the canidate set. In the sixth step(S606), it reads a candidate subsequence from the database to the main memory. In the seventh step(S607), it calculates the Len(Q)-dimensional distance between the candidate subsequence and the query sequence. If the distance is greater than $\epsilon$, the subsequence is discarded because it is a false alarm. Otherwise, the subsequence is selected as the similar subsequence.

Using the above enhanced algorithm that constructs a query for an MBR rather than an individual point, we can reduce the number of range queries (from the number of points to the number of MBRs) and moreover obtain the same candidate set as that of the basic algorithm that uses individual points directly in the range queries. This is done by the "index-level filtering" that filters false alarms in the index by computing the f-dimensional distance between each point in the MBR and each point in the search result and by including in the candidate set only those points that are in $\epsilon/\sqrt{p}$-match. That is, using MBRs to search the index tends to increase the size of the candidate set, but these additional candidates can be removed before the disk accesses and Len(Q)-dimensional distance computations by computing the f-dimensional distance between each point in the MBR and each point in the search result.

Using this enhanced subsequence matching algorithm, Dual Match can reduce the size of the candidate set and improve performance compared to FRM.

Experimental results show that Dual Match drastically reduces the number of candidates-down to as little as 1/9000 of that for FRM-and improves performance up to 160-fold. Dual Match also provides excellent performance in index creation by dividing data sequences into disjoint windows. Experimental results show that it is 14~230 times faster than FRM in building indexes of approximately same sizes. Overall, these results indicate that Dual Match is a novel invention that will replace FRM that is regarded as a general solution in subsequence matching.

According to the above description, Dual Match, the subsequence matching method of the present invention in time-series databases, can store individual points directly in the index because the number of points to be stored in the index is only about 1/ω as large as that of FRM due to dividing data sequence into disjoint windows based on the duality in constructing windows. Further, Dual Match divides the query sequence into sliding windows and uses the individual points representing the windows to search the index. Accordingly, Dual Match exploits the point-filtering effect by comparing the points in the query and the points stored in the index, and thus, it can obtain the effect that reduces false alarms drastically and improves performance significantly.

Moreover, since Dual Match divides data sequences into disjoint windows, it needs only 1/ω as many calls as FRM to the feature extraction functions, which are a major part of CPU overhead in the index creation, and thus, it can create the index much faster than FRM.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A method of subsequence matching in time-series databases, comprising the steps of:

a) using duality in constructing windows;

b) dividing data sequences into disjoint windows based on the a);

c) dividing the query sequence into sliding windows based on the a); and d) performing subsequence matching using the windows constructed in the b) and c) wherein the data sequence is divided into disjoint windows rather than sliding windows to reduce the number of calls to feature extraction functions needed in index creation.

2. The method according to claim 1, wherein the step d) is comprising the steps of:

a) storing individual points-which represent disjoint windows of data sequences-directly in the index; and b) using individual points-which represent sliding windows of the query sequence-in the range query.

3. The method according to claim 2, including further the step that use MBRs containing multiple transformed points rather than individual points that represent sliding windows of the query sequence, for the range queries to reduce the number of range queries.

4. A method of building the multidimensional index that is used in a subsequence matching method, comprising the steps of:

a) creating and initializing an f-dimensional index;

b) reading a data sequence from the time-series database;

c) dividing the data sequence, which is read in the b), into disjoint windows;

d) transforming a disjoint window, which is constructed in the c), to an f-dimensional point by using the feature extraction function;

e) constructing a record by using the transformed point in the d), the data sequence identifier that is including the corresponding window, the start offset of the window;

f) inserting the record, which are constructed in the e), into the f-dimensional index;

g) repeating the d), e), and f) for all disjoint windows that are generated in the c);

h) confirming whether there is any more data sequence to read from a database or not; and i) ending the index creation process if there is no more data sequence in the h), or repeating the index creation processing by returning to the c) after reading the next data sequence from the database.

5. A method of subsequence matching that find similar subsequences to a query sequence using a time-series database and a multidimensional index, comprising steps of:

a) calculating the minimum number of disjoint windows in a subsequence;

b) dividing the query sequence into sliding windows;

c) transforming sliding windows, which are constructed in the b), to f-dimensional points by using the feature extraction function;

d) constructing range queries by using the transformed points in the c), p calculated in step a), and the user specified $\epsilon$;

e) constructing a candidate set by searching the multidimensional index using the range queries that are constructed in the d);

f) reading candidate subsequences, which are contained in the candidate set, into a main memory; and g) confirming whether the candidate subsequences are false alarms or not by calculating distances between them and the query sequence.

6. A method of enhanced subsequence matching that find similar subsequences to a query sequence using the time-series database and a multidimensional index, comprising steps of:

a) calculating the minimum number of disjoint windows in a subsequence;

b) dividing the query sequence into sliding windows, transforming sliding windows to f-dimensional points by using a feature extraction function, and constructing MBRs containing multiple points;

c) constructing range queries by using the MBRs constructed in the b), the minimum number of disjoint windows calculated in the a), and a user specified $\epsilon$;

d) searching the multidimensional index using the range queries that are constructed in the c);

e) constructing a candidate set by calculating the distance each point in the MBR of the c) and each point in the search result;

f) reading candidate subsequences, which are contained in the candidate set, into the main memory; and g) confirming whether the candidate subsequences are false alarms or not by calculating distances between them and the query sequence.

* * * * *